United States Patent
Kai et al.

(10) Patent No.: US 9,153,982 B2
(45) Date of Patent: Oct. 6, 2015

(54) VEHICLE BATTERY CHARGING APPARATUS COMPRISING DETECTING CONNECTING STATE OF CHARGING CONNECTOR TO VEHICLE INLET

(75) Inventors: Takafumi Kai, Hitachi (JP); Masayoshi Kaneyasu, Hitachi (JP); Hiroyuki Yanagisawa, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 467 days.

(21) Appl. No.: 13/612,028

(22) Filed: Sep. 12, 2012

(65) Prior Publication Data
US 2013/0069589 A1    Mar. 21, 2013

(30) Foreign Application Priority Data

Sep. 16, 2011 (JP) ................. 2011-202601
Aug. 17, 2012 (JP) ................. 2012-180742

(51) Int. Cl.
  *H02J 7/00* (2006.01)
  *B60L 11/18* (2006.01)
(52) U.S. Cl.
  CPC ........... *H02J 7/0042* (2013.01); *B60L 11/1838* (2013.01); *H02J 7/0027* (2013.01)
(58) Field of Classification Search
  CPC .... H02J 7/0042; H02J 7/0027; B60L 11/1838
  See application file for complete search history.

(56) References Cited

U.S. PATENT DOCUMENTS

| | | | |
|---|---|---|---|
| 7,688,024 B2 * | 3/2010 | Kamaga ................ | 320/104 |
| 8,368,350 B2 * | 2/2013 | Iwanaga et al. ........... | 320/109 |
| 8,698,346 B2 * | 4/2014 | Kamaga ................ | 307/9.1 |
| 2010/0079105 A1 * | 4/2010 | Iwanaga et al. ........... | 320/109 |
| 2010/0301802 A1 | 12/2010 | Iida | |
| 2012/0091824 A1 * | 4/2012 | Campolo et al. ........... | 307/135 |
| 2014/0327395 A1 * | 11/2014 | Ichikawa ............... | 320/108 |

FOREIGN PATENT DOCUMENTS

| | | |
|---|---|---|
| JP | 4-145807 A | 5/1992 |
| JP | 2010-148245 A | 7/2010 |
| JP | A-2010-283902 | 12/2010 |

OTHER PUBLICATIONS

Japanese Office Action dated May 26, 2015 issued in corresponding Japanese Patent Application No. 2012-180742, with English translation.

* cited by examiner

*Primary Examiner* — Naum B Levin
(74) *Attorney, Agent, or Firm* — Scully, Scott, Murphy & Presser, P.C.

(57) ABSTRACT

A vehicle battery charging apparatus includes a charging connector including a charging current output terminal for outputting a charging current to a vehicle having an electric motor as a drive source and a proximity detection terminal for detecting a proximity of the charging connector to an inlet on the vehicle, a voltage output portion that outputs a voltage from the proximity detection terminal via a first resistor, a detection means that can detect a variation in current flowing through the first resistor caused by fitting the charging connector to the vehicle inlet, and a control section that detects the proximity of the charging connector and the vehicle inlet based on the variation in current flowing through the first resistor detected by the detection means, and enables the charging current output terminal to output a charging current when the proximity is detected.

9 Claims, 5 Drawing Sheets

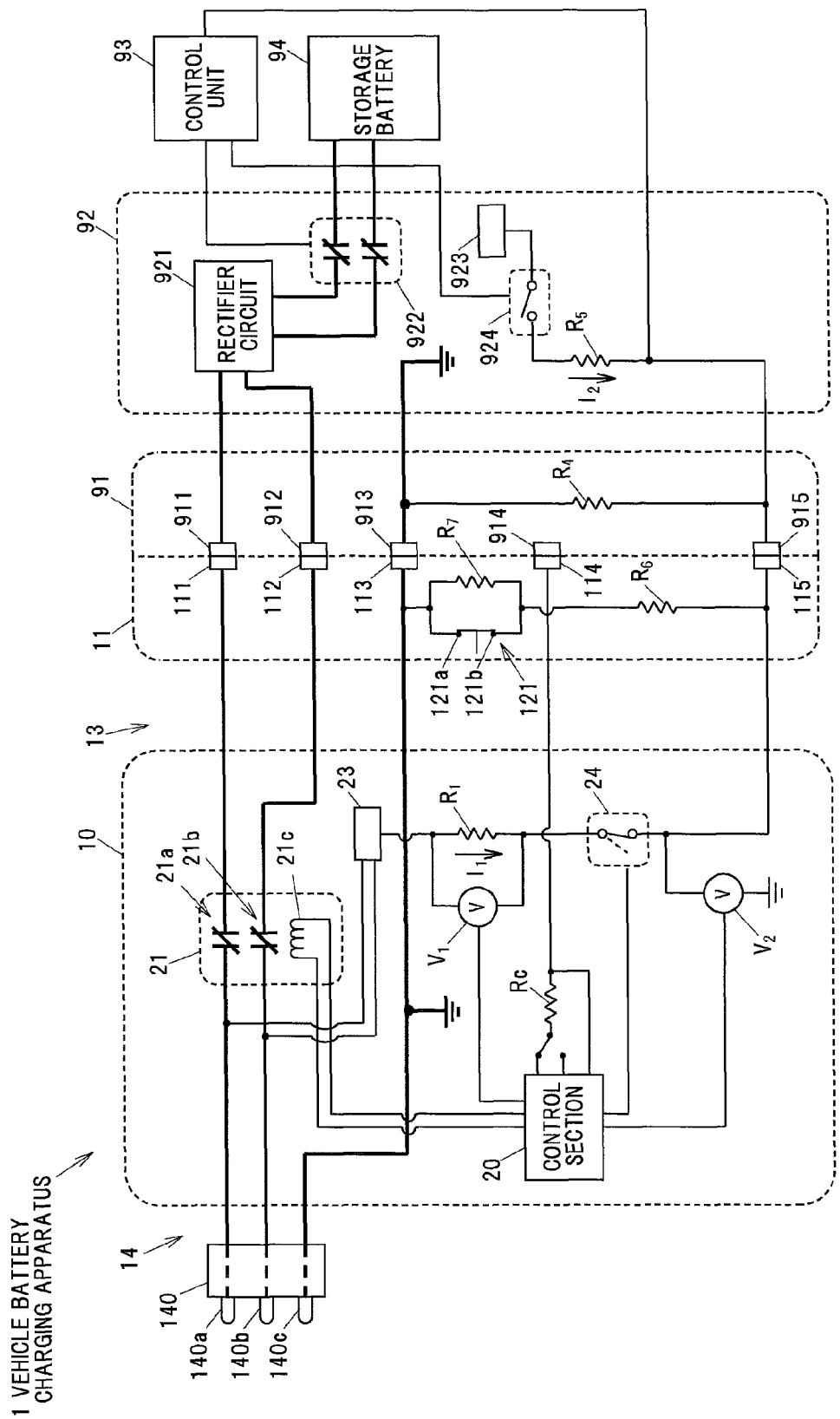

VEHICLE BATTERY CHARGING APPARATUS COMPRISING DETECTING CONNECTING STATE OF CHARGING CONNECTOR TO VEHICLE INLET

The present application is based on Japanese patent application Nos. 2011-202601 and 2012-180742 filed on Sep. 16, 2011 and Aug. 17, 2012, respectively, the entire contents of which are incorporated herein by reference.

BACKGROUND OF THE INVENTION

1. Field of the Invention

The invention relates to a vehicle battery charging apparatus for charging a vehicle having an electric motor as a drive source, such as so-called Plug-in Hybrid Vehicle (PHV).

2. Description of the Related Art

In recent years, vehicles using an electric motor as a drive source for driving a vehicle are becoming widespread as environmental issues are taken into account. A charging stand for charging such vehicles as in, e.g., JP-A-2010-283902 is known.

The charging stand disclosed in JP-A-2010-283902 is configured such that voltage application is started based on a result of communication with a vehicle when a charging connector is connected to a vehicle having a function of communicating therewith and voltage application is started by operating a charging start switch when the charging connector is connected to a vehicle not having a communication function. Note that, a standard for the charging connector and the specification of communication between the charging stand and the vehicle, etc., are defined in the international standard SAE J1772.

SUMMARY OF THE INVENTION

If a vehicle without the communication function is charged at the charging stand, since the voltage application can be started only by operating the charging start switch, the voltage application can be started even when the charging connector is not fitted to the vehicle side. Therefore a risk may exist that electric leakage or electric shock, etc., occurs due to inappropriate handling by a user.

Accordingly, it is an object of the invention to provide a vehicle battery charging apparatus that allows the start of the charging only when detecting the proximity (herein "proximity" means a fitted state of a charging connector to a vehicle inlet) of a charging connector to the vehicle side even when a vehicle without the communication function with the charging apparatus is charged.

(1) According to one embodiment of the invention, a vehicle battery charging apparatus comprises:

a charging connector comprising a charging current output terminal for outputting a charging current to a vehicle having an electric motor as a drive source and a proximity detection terminal for detecting a proximity of the charging connector to a inlet (herein "inlet (or vehicle inlet)" means a vehicle side connector to which the charging connector is connected) on the vehicle;

a voltage output portion that outputs a voltage from the proximity detection terminal via a first resistor;

a detection means that can detect a variation in current flowing through the first resistor caused by fitting the charging connector to the vehicle inlet; and a control section that detects the proximity of the charging connector and the vehicle inlet based on the variation in current flowing through the first resistor detected by the detection means, and enables the charging current output terminal to output a charging current when the proximity is detected.

In the above embodiment (1) of the invention, the following modifications and changes can be made.

(i) The vehicle battery charging apparatus further comprises:

a switching circuit switchable from a connected state of the first resistor to the proximity detection terminal to a disconnected state, wherein the control section operates the switching circuit to be a disconnected state when detecting the proximity of the charging connector and the vehicle inlet.

(ii) The switching circuit is switchable between a first connection state and a second connection state, the first connection state allowing the first resistor to be connected to the proximity detection terminal and the second connection state allowing one end of a second resistor grounded at an other end is to be connected to the proximity detection terminal, and wherein the control section detects a disengagement (i.e., separation or removal) of the charging connector from the vehicle inlet based on a variation in voltage of the proximity detection terminal in the second connection state of the switching circuit and disables output of the charging current from the charging current output terminal when the disengagement is detected.

Effects of the invention

According to one embodiment of the invention, a vehicle battery charging apparatus can be provided that allows the start of the charging only when detecting the proximity of a charging connector to the vehicle side even when a vehicle without the communication function with the charging apparatus is charged.

BRIEF DESCRIPTION OF THE DRAWINGS

Next, the present invention will be explained in more detail in conjunction with appended drawings, wherein:

FIG. 5 is a schematic diagram illustrating a configuration example of a vehicle battery charging apparatus in a second embodiment of the invention and a vehicle.

DETAILED DESCRIPTION OF THE PREFERRED EMBODIMENTS

First Embodiment

An example of a vehicle battery charging apparatus and a vehicle battery charging system in the embodiment of the invention will be described below in reference to FIGS. 1 to 4.

Structure of Vehicle Battery Charging Apparatus

Figure 1:
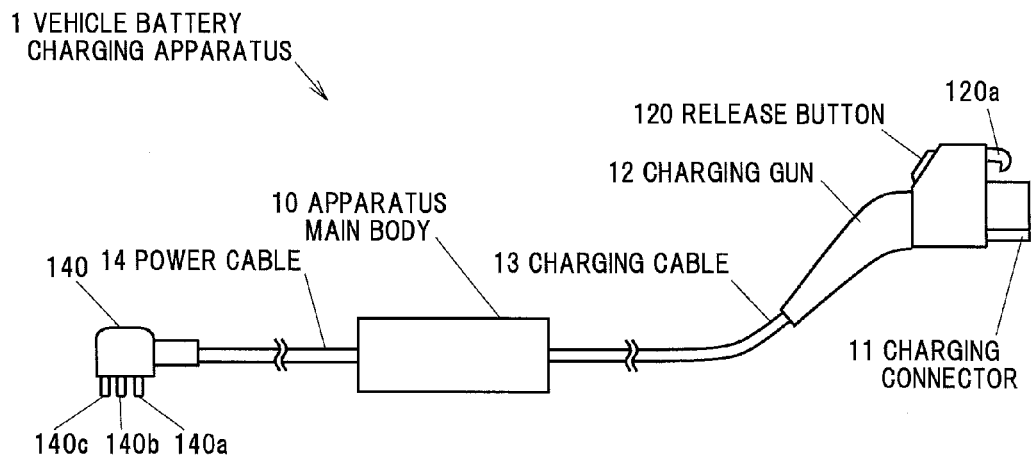
FIG. 1 is a schematic structural view showing a vehicle battery charging apparatus in a first embodiment of the present invention.

FIG. 1 is a schematic structural view showing a vehicle battery charging apparatus in the embodiment of the invention.

A vehicle battery charging apparatus 1 is configured to include a charging gun 12 having a charging connector 11 provided at an end portion thereof, a charging cable 13 which is connected to the charging connector 11 inside the charging gun 12, an apparatus main body 10 for charging a below-described vehicle 9 via the charging cable 13 and the charging connector 11, and a power cable 14 having a plug 140 provided at an end portion thereof.

A release button 120 is provided on the charging gun 12. An engaging protrusion 120a is joined to the release button 120, and it is configured such that the engaging protrusion 120a is moved by pushing the release button 120 to allow the charging connector 11 fitted to the below-described vehicle 9 to be extracted. Meanwhile, the plug 140 has first and second power supply terminals 140a and 140b to be connected to a commercial power supply and a ground terminal 140c.

Structure of Vehicle Battery Charging System

Figure 2:
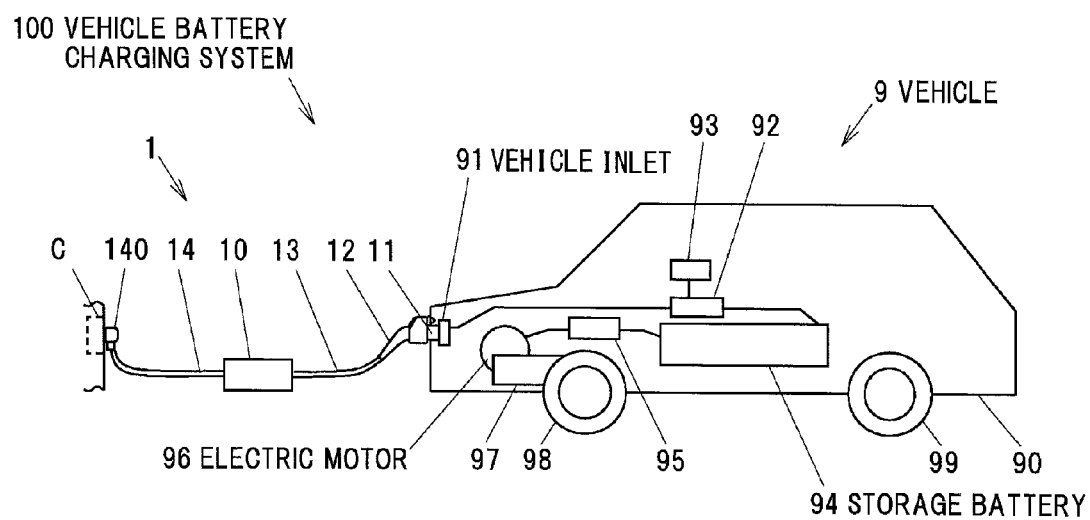
FIG. 2 is a schematic structural view showing a vehicle battery charging apparatus and a vehicle.

FIG. 2 is a schematic structural view showing a vehicle battery charging system and a vehicle in the embodiment of the invention.

A vehicle battery charging system 100 includes the vehicle battery charging apparatus 1, a vehicle inlet 91 to be fitted to the charging connector 11, a charge control circuit 92 connected to an input terminal of the vehicle inlet 91, a control unit 93 for controlling the charge control circuit 92, and a storage battery 94. The vehicle inlet 91, the charge control circuit 92, the control unit 93 and the storage battery 94 are fixed to a vehicle body 90. The storage battery 94 is, e.g., a lithium-ion battery having plural cells.

Mounted on the vehicle body 90 are also an electric motor 96 as a drive source for driving the vehicle 9, an inverter 95 by which electric power stored in the storage battery 94 is supplied as a motor current switched by PWM (Pulse Width Modulation) control to the electric motor 96, and a transmission 97 by which output of the electric motor 96 is converted and transmitted to front wheels 98. The electric motor 96 is, e.g., IPM (Interior Permanent Magnet Motor). Alternatively, output of the transmission 97 may be transmitted to rear wheels 99 so as to be a rear-wheel-drive vehicle.

The plug 140 of the power cable 14 of the vehicle battery charging apparatus 1 is connected to an electrical outlet C which outputs AC power at, e.g., a voltage of 200V and a frequency of 50 Hz or 60 Hz. Thus, the apparatus main body 10 is connected to a commercial power supply via the power cable 14.

Structure of Charging Connector 11

Figure 3:
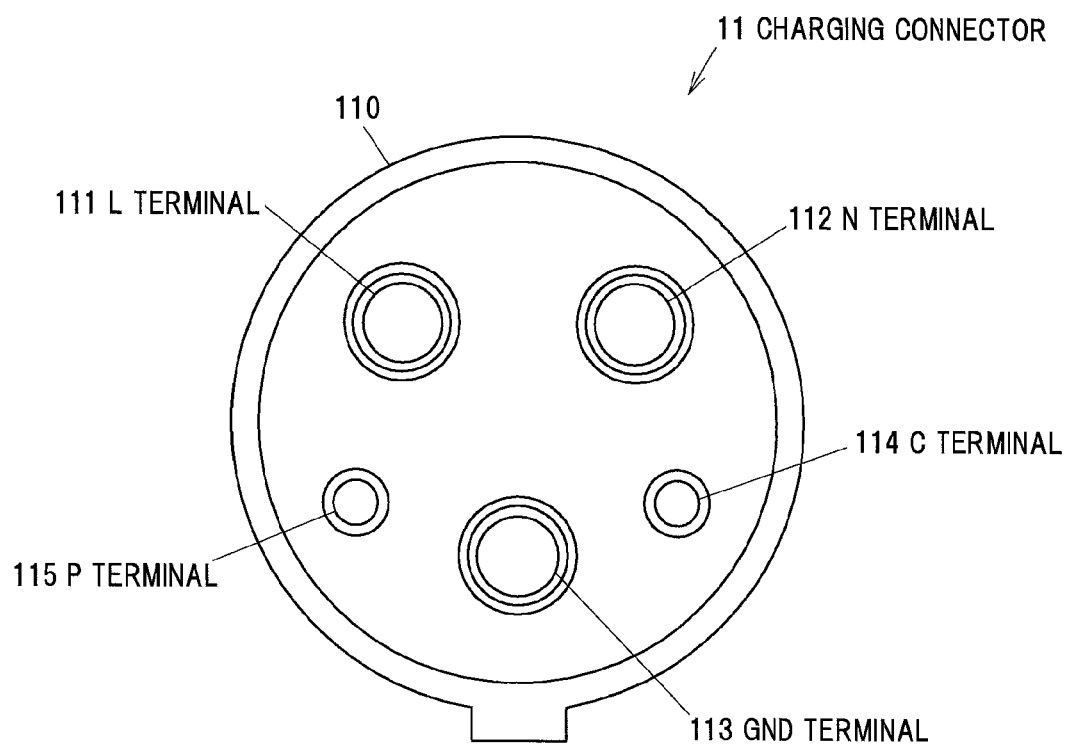
FIG. 3 is a front view showing a structure of a charging connector.

FIG. 3 is a front view of a structure of the charging connector 11 of the vehicle battery charging apparatus 1 when viewed from a terminal side. The charging connector 11 is compliant with SAE J1772.

The charging connector 11 has a housing 110, an L terminal 111 and a N terminal 112 as a pair of charging current output terminals which output voltage to charge the vehicle 9, a GND terminal 113 which is electrically grounded, a C terminal 114 as a charging control terminal and a P terminal 115 as a proximity detection terminal for detecting the proximity to the vehicle inlet 91.

Circuit Configuration of Vehicle Battery Charging Apparatus 1

Figure 4:
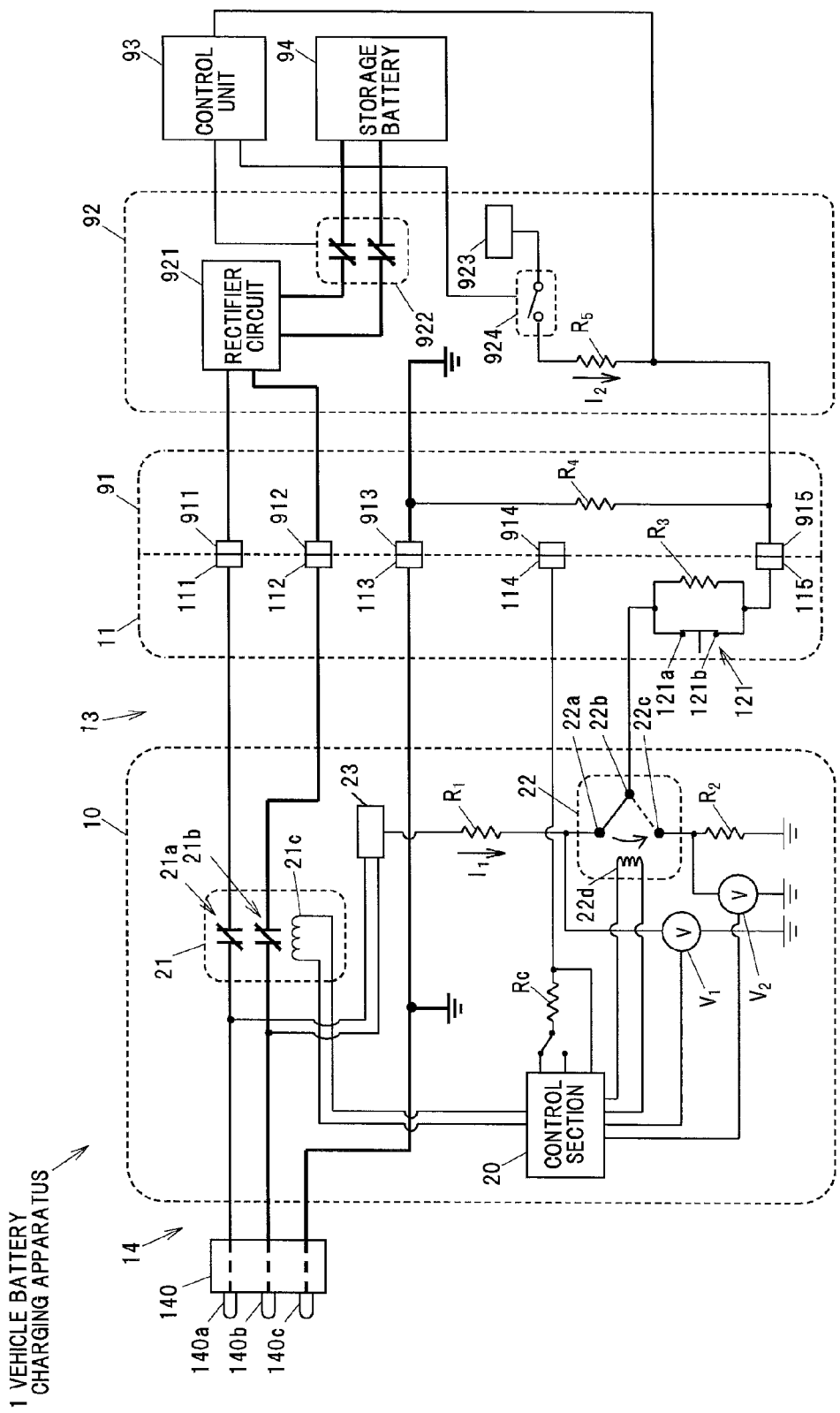
FIG. 4 is a schematic diagram illustrating a configuration example of the vehicle battery charging apparatus and the vehicle.

FIG. 4 shows a configuration example of the vehicle battery charging apparatus 1, as well as the vehicle side connector 91, the charge control circuit 92, the control unit 93 and the storage battery 94 of the vehicle 9, and also a peripheral circuit thereof.

The apparatus main body 10 of the vehicle battery charging apparatus 1 has a control section 20 which controls supply and interruption of charging current to the vehicle 9, etc. The control section 20 is composed of a CPU (Central Processing Unit) operating in accordance with, e.g., a pre-stored program and a peripheral circuit thereof.

The control section 20 controls on (current relay) and off (disconnection) of a relay circuit 21 which is provided in the apparatus main body 10. The relay circuit 21 has a first contact portion 21a, a second contact portion 21b and a coil 21c for actuating the first contact portion 21a and the second contact portion 21b. The first contact portion 21a and the second contact portion 21b are both in an on-state when an electric current is supplied from the control section 20 to the coil 21c, and the first contact portion 21a and the second contact portion 21b are both in an off-state when the electric current is not supplied from the control section 20.

The first contact portion 21a of the relay circuit 21 is provided between the first power supply terminal 140a of the plug 140 connected thereto via the power cable 14 and the L terminal 111 of the charging connector 11 connected thereto via the charging cable 13. Meanwhile, the second contact portion 21b is provided between the second power supply terminal 140b of the plug 140 and the N terminal 112 of the charging connector 11. Accordingly, when an electric current is supplied from the control section 20 to the coil 21c, the first power supply terminal 140a is connected to the L terminal 111 and the second power supply terminal 140b is connected to the N terminal 112.

In addition, the control section 20 controls a switching circuit 22 provided in the apparatus main body 10. The switching circuit 22 is a two-contact relay having a first contact 22a, a second contact 22b, a third contact 22c and a coil 22d, and is switchable between a first connection state in which the first contact 22a is connected to the second contact 22b and a second connection state in which the second contact 22b is connected to the third contact 22c. The second contact 22b and the third contact 22c are disconnected in the first connection state, and the first contact 22a and the second contact 22b are disconnected in the second connection state. The switching circuit 22 is in the first connection state when a current is not supplied to the coil 22d, and is in the second connection state when a current is supplied from the control section 20 to the coil 22d.

An end of a first resistor $R_1$ is connected to the first contact 22a. Another end of the first resistor $R_1$ is connected to a voltage output portion 23. The voltage output portion 23 is a DC power source by which an alternating current supplied from the first power supply terminal 140a and the second power supply terminal 140b is converted into and output as, e.g., 5V of DC. In addition, a resistance value of the first resistor $R_1$ is, e.g., The second contact 22b is connected, via the charging cable 13, to a switch 121 which is arranged inside the charging connector 11. The switch 121 has two contacts 121a and 121b which move in conjunction with the release button 120 of the charging gun 12 so as to flow a current in a normal state in which the release button 120 is not pushed and to be insulated when the release button 120 is pushed. The contact 121a is connected to the second contact 22b of the switching circuit 22, and the contact 121b is connected to the P terminal 115 of the charging connector 11.

Meanwhile, an end of a second resistor $R_2$ is connected to the third contact 22c. Another end of the second resistor $R_2$ is electrically grounded so as to be the same potential as the ground terminal 140c of the plug 140 (reference potential). A resistance value of the second resistor $R_2$ is, e.g., 150 Ω.

In addition, a third resistor $R_3$ is connected in parallel to the switch 121. An end of the third resistor $R_3$ is connected to the contact 121a and another end is connected to the contact 121b. A resistance value of the third resistor $R_3$ is, e.g., 330 Ω.

Accordingly, when the switching circuit 22 is in the first connection state, the first resistor $R_1$ is connected (short-circuited) to the P terminal 115 via the switch 121. On the other hand, when the switching circuit 22 is in the second connection state, the second resistor $R_2$ is connected (short-circuited) to the P terminal 115 via the switch 121. In addition, the voltage output portion 23 can output a voltage from P terminal 115 through the first resistor $R_1$, the switching circuit 22 and the switch 121 when the switching circuit 22 is in the first connection state.

A first voltmeter $V_1$ for measuring voltage of the first contact 22a (reference potential and difference in potential) is connected to the first contact 22a of the switching circuit 22. The first voltmeter $V_1$ is an example of a detection means which can detect voltage drop when a current flows through the first resistor $R_1$, i.e., variation in a current flowing through the first resistor $R_1$. In addition, a second voltmeter $V_2$ for measuring voltage of the third contact 22c (reference potential and difference in potential) is connected to the third contact 22c of the switching circuit 22.

The first voltmeter $V_1$ and the second voltmeter $V_2$ may be, e.g., an AD converter for converting an analog signal into a digital signal or a comparator for comparing with a predetermined voltage value. A detection signal indicating a voltage value detected by the first voltmeter $V_1$ and the second voltmeter $V_2$ is output to the control section 20.

Meanwhile, the control section 20 has a communication function for sending information, such as an allowable current value of the charging current, to the vehicle 9 using a pulse signal controlled by PWM (Pulse Width Modulation). A transmission signal from the control section 20 is output from the C terminal 114 of the charging connector 11 to the vehicle 9 via a communication resistor Rc. In addition, the control section 20 can monitor voltage of the communication resistor Rc on the C terminal 114 side.

Structure of Vehicle 9

The vehicle side connector 91 has a first terminal 911, a second terminal 912, a third terminal 913, a fourth terminal 914 and a fifth terminal 915 which are respectively connected to the L terminal 111, the N terminal 112, the GND terminal 113, the C terminal 114 and the P terminal 115 when fitted to the charging connector 11. Between the third terminal 913 and the fifth terminal 915, a fourth resistor $R_4$ is connected. A resistance value of the fourth resistor $R_4$ is, e.g., 2700 Ω.

The charge control circuit 92 has a rectifier circuit 921, a relay circuit 922, a DC power source 923, a switch 924 and a fifth resistor $R_5$. The DC power source 923 is, e.g., a 5V power supply. The switch 924 is provided between the DC power source 923 and the fifth resistor $R_5$ and is controlled to be on and off by the control unit 93. The fifth resistor $R_5$ is pull-up resistance which is pulled up by output of the DC power source 923 and a resistance value thereof is, e.g., 330 Ω.

The rectifier circuit 921 is connected to the first terminal 911 and the second terminal 912 of the vehicle side connector 91. In the rectifier circuit 921, an alternating current input from the first terminal 911 and the second terminal 912 is rectified and output to the relay circuit 922. The rectifier circuit 921 is, e.g., a diode bridge circuit. An inrush current limiting circuit for limiting inrush current when the charging starts, etc., may be further provided between the rectifier circuit 921 and the relay circuit 922.

On (current relay) and off (disconnection) of the relay circuit 922 is controlled by the control unit 93. When the relay circuit 922 is on, the storage battery 94 is charged by power supplied from the first terminal 911 and the second terminal 912.

An end of the fifth resistor $R_5$ is connected to the fifth terminal 915 of the vehicle side connector 91 and the control unit 93. The control unit 93 can detect voltage of the end of the fifth resistor $R_5$ (reference potential and difference in potential).

The control unit 93 monitors a charging current to the storage battery 94 to detect the start of charging, and turns on the switch 924 when the start of charging is detected.

Note that, since the vehicle 9 in the present embodiment does not have a function of communicating with the vehicle battery charging apparatus 1, a transmission signal output from the control section 20 of the vehicle battery charging apparatus 1 to the C terminal 114 is not input to the vehicle 9. It is possible to detect the proximity of the charging connector 11 and the vehicle inlet 91 by establishment of communication between the control section 20 and a vehicle when the vehicle has a communication function, however, another method is required to detect the proximity of the charging connector 11 and the vehicle inlet 91 when the vehicle does not have a communication function.

In the present embodiment, the proximity of the charging connector 11 and the vehicle inlet 91 is detected based on the voltage detected by the first voltmeter $V_1$. Following is the detailed explanation of a method of detecting a proximity.

Method of Detecting the Proximity

When the plug 140 is connected to the electrical outlet C and the charging connector 11 is in a disengagement in which the charging connector 11 is not engaged to the vehicle inlet 91, the switching circuit 22 is in the first connection state in which the first contact 22a is connected to the second contact 22b.

In the disengagement, the P terminal 115 connected to the second contact 22b via the switch 121 is in an insulated state while +5V DC is supplied from the voltage output portion 23 to the first contact 22a via the first resistor $R_1$. Therefore, the voltage of the first contact 22a detected by the first voltmeter $V_1$, i.e., the voltage of the P terminal 115 is +5V.

When the charging connector 11 is engaged to the vehicle inlet 91, the P terminal 115 of the charging connector 11 is connected to the fifth terminal 915 of the vehicle inlet 91. In addition, the fifth terminal 915 is connected to the third terminal 913 via the fourth resistor $R_4$ and the third terminal 913 is connected to the GND terminal 113.

Accordingly, the voltage supplied from the voltage output portion 23 causes a current $I_1$ to flow through the first resistor $R_1$ and the fourth resistor $R_4$, and the voltage of the first contact 22a detected by the first voltmeter $V_1$ becomes lower than in the disengagement state due to voltage drop at the first resistor $R_1$. For example, when the resistance value is common to the first resistor $R_1$ and the fourth resistor $R_4$, the voltage detected by the first voltmeter $V_1$ is a half of output voltage of the output portion 23 which is +2.5V.

The control section 20 detects the proximity of the charging connector 11 and the vehicle inlet 91 based on the variation (drop) in voltage, i.e., variation in a current flowing through the first resistor $R_1$. When the proximity is detected, the control section 20 supplies a current to the coil 21c of the relay circuit 21 to turn on both of the first contact portion 21a and the second contact portion 21b. Alternatively, the first contact portion 21a and the second contact portion 21b may be turned on after detecting the proximity of the charging connector 11 and the vehicle inlet 91 and also after elapsing a predetermined time by which contact between the L terminal 111 and the first terminal 911 and that between the N terminal 112 and the second terminal 912 become stable. As described above, when the proximity of the charging connector 11 and the vehicle inlet 91 is detected, the control section 20 switches to a state in which the L terminal 111 and the N terminal 112 can output a charging current.

In addition, when the proximity of the charging connector 11 and the vehicle inlet 91 is detected, the control section 20 immediately supplies a current to the coil 22d so that the switching circuit 22 is switched to the second connection state. As a result, the first resistor $R_1$ and the P terminal 115 are disconnected and the second resistor $R_2$ is connected to the P terminal 115.

Switching to the second connection state is a measure to allow the control unit 93 of the vehicle 9 to detect that the release button 120 of the charging gun 12 is pushed. In other words, since the charging connector 11 is more likely to be extracted from the vehicle inlet 91 when the release button 120 is pushed by a user, it is necessary to promptly turn off the relay circuit 922 in order to suppress spark caused by separation of the L terminal 111 from the first terminal 911 and that of the N terminal 112 from the second terminal 912 in a live-line state.

Based on the variation in voltage of the P terminal 115, the control unit 93 detects that the release button 120 is pushed. In other words, when the release button 120 is pushed, the contacts 121a and 121b of the switch 121 are disconnected and a resistance value from an end of the fifth resistor $R_5$ to a ground potential varies. In more detail, the resistance value from the end of the fifth resistor $R_5$ to the ground potential varies from the resistance value before pushing the release button 120 (a parallel resistance value of the second resistor $R_2$ and the fourth resistor $R_4$) to a parallel resistance value of series resistance of the second resistor $R_2$ and the third resistor $R_3$ and resistance of the fourth resistor $R_4$, and the resistance value from the end of the fifth resistor $R_5$ to the ground potential increases. Since this results in that a value of a current $I_2$ flowing through the fifth resistor $R_5$ varies, voltage of the end of the fifth resistor $R_5$ varies. Based on this variation in the voltage, the control unit 93 detects that the release button 120 is pushed.

In addition, the control section 20 detects the extraction of the charging connector 11 from the vehicle side connector 91 based on the variation in the voltage of the third contact 22c of the switching circuit 22 detected by the second voltmeter $V_2$ and stops current supply to the coil 21c of the relay circuit 21 when detecting the extraction, thereby turning off both of the first contact portion 21a and the second contact portion 21b.

That is, since the output of the DC power source 923 is not supplied to the vehicle battery charging apparatus 1 when the charging connector 11 is extracted from the vehicle side connector 91, voltage of the third contact 22c of the switching circuit 22, i.e., the voltage of the P terminal 115 becomes zero. The control section 20 detects the extraction of the charging connector 11 based on this variation in the voltage, and disables output of a charging current from the L terminal 111 and the N terminal 112 when the extraction is detected. This measure is to prevent electric shock to a user and electric leakage in a state that the charging connector 11 is extracted.

Functions and Effects of the First Embodiment

In the first embodiment, the following functions and effects are obtained.

(1) It is possible to detect the proximity of the charging connector 11 and the vehicle inlet 91 even though the vehicle 9 does not have a function of communicating with the vehicle battery charging apparatus 1, and the charging can be started after detecting the proximity. Therefore, voltage is not present at the C terminal 114 and the P terminal 115 in the disengagement of the charging connector 11 and it is thus possible to prevent electric shock, etc., to the user.

(2) When the control section 20 detects the proximity of the charging connector 11 and the vehicle inlet 91, the switching circuit 22 is immediately switched to the second connection state (e.g., before the control unit 93 starts up and the voltage of the end of the fifth resistor $R_5$ (reference potential and difference in potential) becomes detectable by the control unit 93). Therefore, it is possible to reduce the time required to supply voltage from the voltage output portion 23 to the vehicle 9 via the fifth terminal 915 and to suppress effects on the operation of the vehicle 9, and it is also possible to detect the extraction of the charging connector 11 from the vehicle side connector 91.

Here, "the effects on the operation of the vehicle 9" will be described in detail below.

When the time required to supply voltage from the voltage output portion 23 to the vehicle 9 is not "reduced" but is, e.g., "a certain period of time", the control unit 93 starts up before switching to the second connection state and detects voltage at the end of the fifth resistor $R_5$ which is affected by voltage from the voltage output portion 23. In this case, the control unit 93 may judge that abnormal voltage is detected, and may cause the vehicle 9 to be in a sleep state or a charging refused state. Therefore, the above-mentioned configuration is employed.

Note that, the sleep state means a state in which the relay circuit 922 is closed and the charging to the storage battery 94 is not started. In this state, the vehicle 9 may actively indicate necessity of fixing failures by lighting an error lamp in the vehicle 9 or sending an error message from the vehicle 9 to an owner through a mobile phone.

(3) Since the control section 20 turns off both of the first contact portion 21a and the second contact portion 21b of the relay circuit 21 when detecting the extraction of the charging connector 11 from the vehicle side connector 91, it is possible to prevent electric shock to a user and electric leakage.

Second Embodiment

Next, the second embodiment of the invention will be described in reference to FIG. 5. FIG. 5 shows a configuration example of the vehicle battery charging apparatus 1 in the second embodiment, as well as the vehicle inlet 91, the charge control circuit 92, the control unit 93 and the storage battery 94 of the vehicle 9, and also a peripheral circuit thereof. In FIG. 5, constituent elements having the same function as those described in the first embodiment are denoted by the same reference numerals, and the overlapped explanation thereof will be omitted.

In the second embodiment, the first resistor $R_1$ connected to the voltage output portion 23 is connected to the P terminal 115 of the charging connector 11 via a switch 24. A resistance value of the first resistor $R_1$ is, e.g., 270Ω. The switch 24 is switched between on (short circuit) and off (disconnection) by the control section 20 and is on in the disengagement of the charging connector 11.

The first voltmeter $V_1$ is connected between the first resistor $R_1$ and the voltage output portion 23 and between the first resistor $R_1$ and the switch 24. The first voltmeter $V_1$ can detect voltage drop caused by a current flowing through the first resistor $R_1$, and variation in the current flowing through the first resistor $R_1$ can be detected based on a value detected by the first voltmeter $V_1$. In other words, the first voltmeter $V_1$ is an example of a detection means in the invention.

In addition, the second voltmeter $V_2$ which can detect the voltage of the P terminal 115 of the charging connector 11 (reference potential and difference in potential) is provided in the apparatus main body 10. A detection signal indicating a voltage value detected by the first voltmeter $V_1$ and the second voltmeter $V_2$ is output to the control section 20.

The switch 121 operated in conjunction with the release button 120 and a sixth resistor $R_6$ are connected in series between the P terminal 115 of the charging connector 11 and GND terminal 113, and a seventh resistor $R_7$ is connected in parallel to the switch 121. A resistance value of the sixth resistor $R_6$ is, e.g., 150Ω and that of the seventh resistor $R_7$ is, e.g., 330 Ω.

In the disengagement of the charging connector 11 and the vehicle side connector 91, a current corresponding to the total resistance value of the first resistor $R_1$ and the sixth resistor $R_6$ flows in a closed circuit in which the first resistor $R_1$, the sixth resistor $R_6$ and the switch 121 form a path.

When the charging connector 11 is fitted to the vehicle side connector 91, the P terminal 115 of the charging connector 11 is connected to the fifth terminal 915 of the vehicle side connector 91 and the third terminal 913 is connected to the GND terminal 113. As a result, the fourth resistor $R_4$ is connected in parallel to a circuit composed of the sixth and seventh resistors $R_6$ and $R_7$ and the switch 121. This decreases a resistance value from the voltage output portion 23 to the ground potential and increases the current flowing through the first resistor $R_1$, and therefore, voltage detected by the first voltmeter $V_1$ becomes large. As a result, it is possible to detect the fitted state of the charging connector 11 and the vehicle side connector 91.

When the proximity of the charging connector 11 and the vehicle inlet 91 is detected, the control section 20 supplies a current to the coil 21c of the relay circuit 21 to switch to a state in which the L terminal 111 and the N terminal 112 can output a charging current.

In addition, the control section 20 turns off the switch 24 when detecting the fitted state of the charging connector 11 and the vehicle inlet 91. When the switch 924 of the vehicle 9 is subsequently turned on, output of the DC power source 923 is output to the P terminal 115 via the fifth resistor $R_5$ and the fifth terminal 915, and output voltage of the DC power source 923 is detected by the second voltmeter $V_2$.

Then, when the charging connector 11 is extracted from the vehicle inlet 91, the output voltage of the DC power source 923 is not present at the P terminal 115, and accordingly, the value detected by the second voltmeter $V_2$ is zero. As a result, it is possible to detect the extraction of the charging connector 11 from the vehicle inlet 91.

Meanwhile, the detected value of the second voltmeter $V_2$ varies when the switch 121 is turned off. Therefore, based on the value detected by the second voltmeter $V_2$, it is possible to detect that the release button 120 is pushed.

When the control section 20 detects that the charging connector 11 is extracted from the vehicle inlet 91 or that the release button 120 is pushed, the control section 20 stops current supply to the coil 21c of the relay circuit 21 to disable output of a charging current from the L terminal 111 and the N terminal 112.

As described above, the same functions and effects as those of the first embodiment are obtained also in the second embodiment.

Although the embodiments of the invention have been described, the invention according to claims is not to be limited to the above-mentioned embodiments. Further, please note that all combinations of the features described in the embodiments are not necessary to solve the problem of the invention.

In addition, the invention is not limited to the first and second embodiments, and various aspects can be implemented without departing from the gist thereof. For example, although variation in the current flowing through the first resistor $R_1$ is detected based on variation in a detection signal of the first voltmeter $V_1$ in the first and second embodiments, it is not limited thereto and the current flowing through the first resistor $R_1$ may be detected by, e.g., an ammeter using a hall element.

What is claimed is:

1. A vehicle battery charging apparatus for outputting a charging current from a power supply to an inlet of a vehicle having an electric motor as a drive source, the vehicle battery charging apparatus comprising:
    a charging connector located between the power supply and the vehicle inlet, the charging connector comprising a charging current output terminal for outputting the charging current to the vehicle inlet and a proximity detection terminal for detecting a proximity of the charging connector to the vehicle inlet;
    a first resistor located between the power supply and the vehicle inlet;
    a voltage output portion located between the power supply and the vehicle inlet that outputs a DC voltage to cause a current to flow through the first resistor to the proximity detection terminal, wherein the voltage output portion comprises a DC power source that operates by converting alternating current supplied thereto;
    a detection means located between the power supply and the vehicle inlet that can detect a variation in the current flowing through the first resistor caused by fitting the charging connector to the vehicle inlet; and
    a control section located between the power supply and the vehicle inlet that detects the proximity of the charging connector to the vehicle inlet based on the variation in current flowing through the first resistor detected by the detection means, and enables the charging current output terminal to output a charging current when the proximity is detected.

2. The vehicle battery charging apparatus according to claim 1, further comprising:
    a switching circuit switchable from a connected state of the first resistor to the proximity detection terminal to a disconnected state of the first resistor to the proximity detection terminal,
    wherein the control section operates the switching circuit to be in the disconnected state after detecting the proximity of the charging connector and the vehicle inlet.

3. The vehicle battery charging apparatus according to claim 2, wherein the switching circuit is switchable between a first connection state and a second connection state, the first connection state allowing the first resistor to be connected to the proximity detection terminal and the second connection state allowing one end of a second resistor grounded at an other end to be connected to the proximity detection terminal, and
    wherein the control section detects a disengagement of the charging connector from the vehicle inlet based on a variation in voltage of the proximity detection terminal in the second connection state of the switching circuit and disables output of the charging current from the charging current output terminal when the disengagement is detected.

4. The vehicle battery charging apparatus according to claim 1, wherein the alternating current is supplied to the DC power source from the power supply.

5. The vehicle battery charging apparatus according to claim 1, wherein the detection means comprises a voltmeter.

6. The vehicle battery charging apparatus according to claim 1, wherein the control section comprises a central processing unit.

7. The vehicle battery charging apparatus according to claim 6, wherein the central processing unit operates in accordance with a pre-stored program.

8. The vehicle battery charging apparatus according to claim 1, wherein the switching circuit comprises a relay circuit.

9. The vehicle battery charging apparatus according to claim 1, further comprising a switch, wherein the voltage output portion outputs the voltage to cause the current to flow through the first resistor to the proximity detection terminal through the switch.

* * * * *